No. 622,904. Patented Apr. 11, 1899.
H. C. SWAN.
KING BOLT SOCKET.
(Application filed Feb. 17, 1899.)
(No Model.)
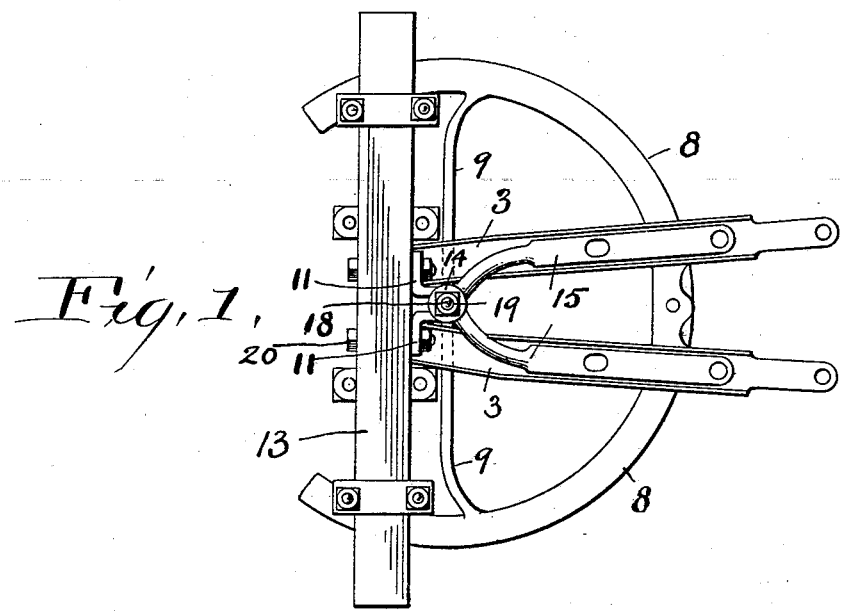
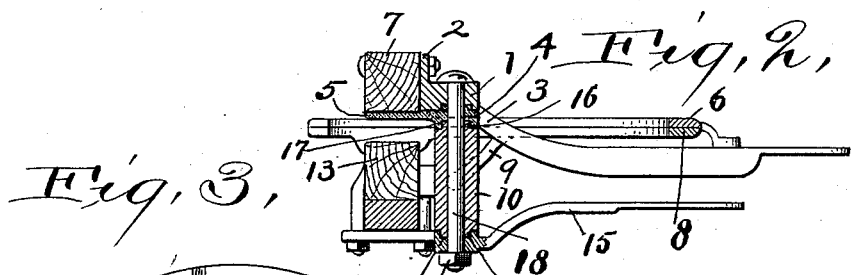
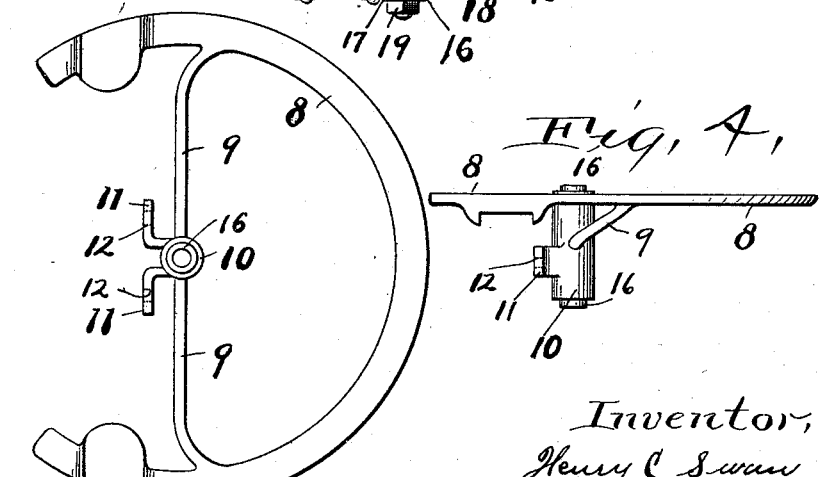

UNITED STATES PATENT OFFICE.

HENRY C. SWAN, OF OSHKOSH, WISCONSIN.

KING-BOLT SOCKET.

SPECIFICATION forming part of Letters Patent No. 622,904, dated April 11, 1899.

Application filed February 17, 1899. Serial No. 705,754. (No model.)

*To all whom it may concern:*

Be it known that I, HENRY C. SWAN, a citizen of the United States of America, residing at Oshkosh, Winnebago county, State of Wisconsin, have invented certain new and useful Improvements in King-Bolt Sockets, of which the following is a specification in such full, clear, and exact terms as to enable any person skilled in the art to which it appertains to make, construct, and use the same.

My invention relates to improvements in king-bolt sockets for vehicles, and relates particularly to that class of king-bolt sockets wherein the parts are formed integral with or are secured to the fifth-wheel members and perch-irons of the vehicle; and it consists in the new and novel features of construction and combination of parts hereinafter set forth and claimed.

The object of my invention is to provide a strong and durable king-bolt socket that can be secured to vehicles having axles of different depths and shapes without any adjustment of the parts forming the socket; and a further object of my invention is to avoid the necessity for a central axle-clip and dispense with the use of a clip-tie secured to the bottom of the axle and provided with an extension encircling the king-bolt.

In the accompanying drawings, Figure I represents a bottom plan view of my improved king-bolt socket secured to the axle of the vehicle; Fig. II, a side elevation, in central section, of the same; Fig. III, a bottom plan view of the lower fifth-wheel and the parts integral therewith; Fig. IV, a side elevation thereof.

The upper member of my improved fifth-wheel socket is provided by the collar 1, that is formed integral with and extends rearwardly from the bolster-plate 2 and between the upper perch-irons 3. A collar 4 is arranged immediately beneath and in line therewith that is formed integral with the brace 5, connecting the ends of the upper fifth-wheel 6 and securing same to the bottom of the bolster 7. Secured to the lower fifth-wheel 8 by means of the arms 9 is a collar 10, so arranged that when the lower fifth-wheel is in position it will register with the upper members of the socket. Said collar is provided with diverging flanges 11, having perforations 12 formed therein, whereby said flanges can be bolted, riveted, or otherwise secured directly to the axle 13 of the vehicle. The lower member of the socket is provided by a collar 14, that is formed at the junction of the lower perch-irons 15.

The collars are interlocked with each other by means of bosses 16, engaging with recesses 17, formed on the adjacent parts. The king-bolt 18 passes through said collars and is secured in place by a nut 19 or other suitable means, thereby holding the collars against displacement. By this construction any connection between the bottom of the axle and the king-bolt socket is avoided. The socket is secured directly to the axle by means of its flanges and no adjustment is necessary to accommodate the socket to axles of different depth and shape. When a central clip and a clip-tie encircling the king-bolt are required, the socket can only be used with axles of a standard size or gage, and if the shape of the axle is changed or varied a new clip must be provided accordingly.

My device can be used with axles of different dimensions or removed from one axle and secured to another without any change of the parts composing the socket. As no adjustments are necessary, the parts can be constructed of malleable iron or similar material, thereby providing a light structure of sufficient strength to withstand all strains.

What I claim is—

1. A king-bolt socket for vehicles consisting of a movable collar interposed between a collar integral with a brace-plate attached to the bolster and a collar formed by the bottom perch-irons, said movable collar being supported by brace-arms extending to a lower fifth-wheel, and secured directly to the axle, substantially as described.

2. A king-bolt socket for vehicles consisting of a collar interposed between a bearing secured to the bolster and a bearing provided by the lower perch-irons and rotatable thereon, brace-irons integral with said collar and secured to the lower fifth-wheel, and diverging flanges integral with said collar whereby same is secured to the axle, substantially as described.

In testimony whereof I sign this application, in the presence of two witnesses, this 10th day of February, 1899.

HENRY C. SWAN.

Witnesses:
G. H. FOSTER,
I. HENDERSON.